United States Patent [19]
Cullen et al.

[11] 3,820,309
[45] June 28, 1974

[54] ADSORBENT CARTRIDGE

[75] Inventors: John S. Cullen, Buffalo; Paul W. Huber, Depew, both of N.Y.

[73] Assignee: Multiform Desiccant Products, Inc., Buffalo, N.Y.

[22] Filed: Oct. 16, 1972

[21] Appl. No.: 297,667

[52] U.S. Cl..................................... 55/387, 312/31
[51] Int. Cl........................................... B01d 53/04
[58] Field of Search...................................... 312/37; 55/387–389; 206/84

[56] References Cited
UNITED STATES PATENTS
2,196,021 4/1940 Merrill.............................. 312/31 X
3,722,188 3/1973 Cullen................................ 55/387

*Primary Examiner*—James C. Mitchell
*Attorney, Agent, or Firm*—Joseph P. Gastel

[57] ABSTRACT

An adsorbent cartridge, containing an adsorbent which may also be a desiccant, for insertion into a container comprising a permeable casing having a longitudinal axis and a cylindrical side wall and substantially planar opposed end walls extending substantially perpendicularly to said side wall, and adsorbent material in said casing. A combination of a container and an adsorbent cartridge with said container having a substantially cylindrical side wall and a bottom wall, and an adsorbent cartridge in said container, said adsorbent cartridge having a substantially planar bottom wall for resting on said bottom wall of said container and also having a substantially cylindrical side wall for positioning throughout its extent in close proximity to the side wall of said container, and a top wall on said adsorbent cartridge for acting as a shelf to support the contents of said container.

2 Claims, 5 Drawing Figures

PATENTED JUN 28 1974  3,820,309

3,820,309

ADSORBENT CARTRIDGE

The present invention relates to an improved adsorbent cartridge of the type which is generally packed with medicinal pills or capsules or other substances to adsorb moisture, odors or other gases from the container in which they are located, the cartridge containing an adsorbent which may also be a desiccant.

By way of background, conventional adsorbent cartridges have a cylindrical body and rounded ends. However, the rounded ends are the basis of a number of disadvantages. First of all, they cause adjacent cartridges in a loading chute to ride up on each other and jam the machine which is used to deposit the cartridges into containers. In addition, the rounded ends cause the cartridges to look like medicinal capsules and they are therefore often confused with such capsules. In addition, rounded end cartridges often bridge across the container in which they are placed, thereby consuming an undesirably large amount of space within the container. It is with overcoming the foregoing deficiencies of prior art adsorbent cartridges that the present invention is concerned.

It is accordingly the primary object of the present invention to provide an improved adsorbent cartridge which will not tend to bridge across a container and therefore tend to occupy a predetermined amount of space within the container; which will be of a configuration which will tend to obviate confusion with medicinal capsules; which will contain a relatively high amount of adsorbent per unit length of the cartridge, thereby increasing its efficiency over rounded end types of cartridges; and which will tend to obviate jamming of machines used for loading the adsorbent cartridges into medicinal containers.

Another object of the present invention is to provide an improved combination of an adsorbent cartridge and a container wherein the cartridge occupies a precisely predetermined position within the container at the bottom thereof and provides a relatively resilient shelf for receiving the contents of the container so as to minimize breakage of the contents during loading of the container. Other objects and attendant advantages of the present invention will be more readily perceived hereafter.

The improved adsorbent cartridge of the present invention comprises a moisture permeable casing having a longitudinal axis and a side wall and first and second opposed end walls for defining an enclosed space, said first end wall being substantially planar and extending substantially perpendicularly to said longitudinal axis, and adsorbent material in said enclosed space. In its more specific aspect, the improved adsorbent cartridge comprises a casing having a cylindrical side wall and substantially planar end walls which are substantially perpendicular to said side wall.

In accordance with another aspect of the present invention, the present invention relates to a combination of a container and an adsorbent cartridge with said container comprising a container bottom wall and a container side wall extending upwardly therefrom, and said adsorbent cartridge comprising a casing defining an enclosed space, casing bottom portion means for resting on said container bottom wall, casing side wall means for occupying a position in close proximity to said container side wall means, container top portion means on said casing for providing a shelf for receiving the contents of said container, and adsorbent material in said casing.

The various aspects of the present invention will be more fully understood when the following portions of the specification are read in conjunction with the accompanying drawings wherein.

Figure 1:
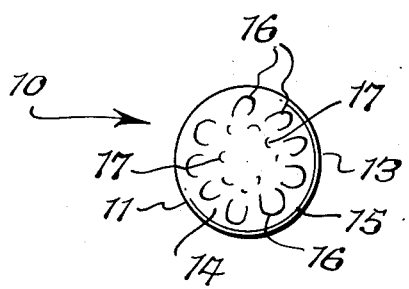
FIG. 1 is an end elevational view of the improved adsorbent cartridge of the present invention showing the flat end portion thereof.
Figure 2:
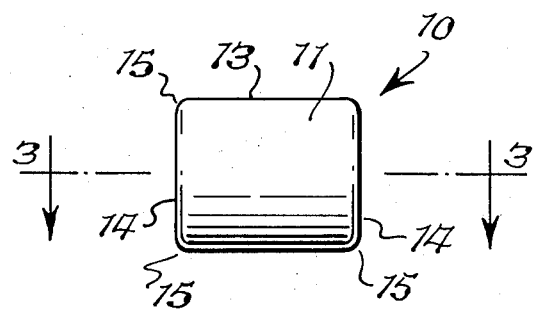
FIG. 2 is a side elevational view of the absorbent cartridge of FIG. 1.
Figure 3:
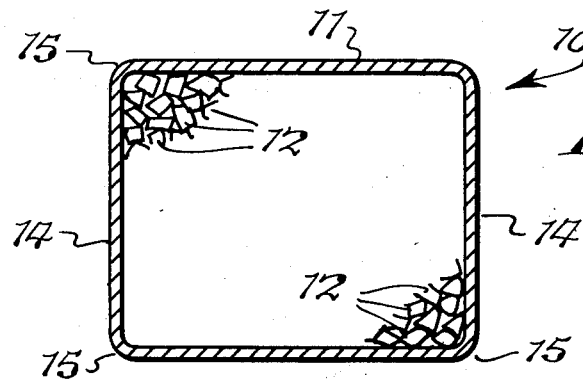
FIG. 3 is a cross sectional view taken substantially along line 3—3 of FIG. 2 and showing the rounded edges of the cartridge at the junction between the flat ends and the cylindrical side wall.

The improved adsorbent cartridge 10 of the present invention, as shown in FIGS. 1-3, includes a casing 11 fabricated from clear cellulose acetate or other suitable material which will transmit moisture, odors or other gases to the adsorbent 12 contained within casing 11. Adsorbent 12 may be any suitable substance which will adsorb moisture, odor or gases from the surroundings in which cartridge 10 is placed. By way of example and not limitation, the adsorbent may be a substance such as clintolite, activated charcoal or crystalline metal aluminosilicates, or it may be a substance having desiccant characteristics such as activated bentonite, silica gel or calcium sulfate. It will be understood that the term "adsorbent" as used in this description is inclusive of desiccants, and that the adsorbent within casing 11 may be a substance for adsorbing gases or odors, or a substance for adsorbing gases and moisture, or a substance for adsorbing moisture only, or the substance within casing 11 may be a mixture of numerous adsorbents and other substances.

Casing 11 includes a cylindrical side wall 13 terminating at opposed substantially planar end walls 14. Annular junctions 15 are located between side wall 11 and end walls 14. Junctions 15 have a small radius so as to lend rigidity to the cartridge and also obviate any cracking in the casing which might occur if an attempt were made to form junction 15 without the radius. Each end wall 14 includes creases such as 16 and knit marks such as 17 which are formed incidental to the process of fabrication of casing 11. However, the knit marks 17 and creases 16 are merely visual indications of where the material was distorted during fabrication, but it is to be understood that there is complete sealing at the ends of cartridge 10 so that there will be no leakage of adsorbent.

The improved adsorbent cartridge 10 of the present invention may be fabricated with any desired ratio of length of side wall 13 to diameter of end wall 14. In the embodiment of FIGS. 1—3, the ratio is relatively low as compared to the ratio of adsorbent cartridge 10' of FIG. 5 which is shown within cylindrical pill container 18 having a circular bottom wall 19, cap 20 and pills 21 therein. One important advantage of the substantially planar ends 14' is that cartridge 10' can be made to come to rest on container bottom 19 in a vertical position, as shown in FIG. 5, thereby obviating bridging across the container which might otherwise occur if the ends of cartridge 10' were conventionally spherical or rounded.

Figure 5:
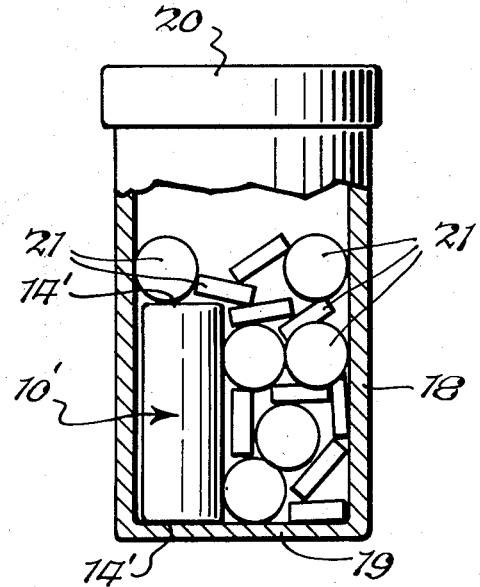
FIG. 5 is a fragmentary side elevational view of a pill container having an improved adsorbent cartridge of the present invention which is dimensioned differently than the cartridge shown in FIGS. 1-3.

In addition to the foregoing advantage, it can be seen that the top end wall 14' in FIG. 5 will also provide a shelf on which the contents of container 18 can come to rest, thereby providing a saving of space within container 18 which is not otherwise realized with capsules having rounded ends which will not support other bodies.

In addition to the advantages noted above, the flat ends, such as 14 and 14', faciliate the feeding of cartridges, such as 10 and 10', to containers, such as 18. In this respect the cartridges are fed from chutes wherein they are positioned in single file and in end-to-end relationship. The flat ends cause the cartridges 10' to rest squarely against each other, whereas cartridges with rounded ends will tend to ride up on each other and create a shingled effect which tends to jam the feeding machine.

An additional advantage of the improved adsorbent cartridge of the present invention is that it can contain a greater amount of adsorbent than a cartridge of the same length having rounded or spherical ends. Therefore the improved cartridge of the present invention is more efficient in that it will have a greater capacity for moisture than the rounded end type of cartridges.

The shape of cartridge 10 has the additional advantage of being decidedly different in shape than medicinal capsules with which it is packed. Therefore, the possibility that a person will mistakenly swallow an adsorbent cartridge rather than a medicinal capsule when both are packed in the same container is virtually eliminated.

Figure 4:
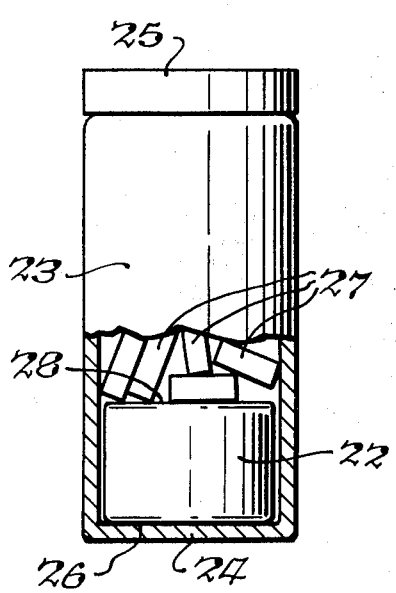
FIG. 4 is a fragmentary side elevational view showing the adsorbent cartridge in a pill container which is of slightly larger diameter than the cartridge.

The improved adsorbent cartridge of the present invention lends itself especially well to the concept of packaging depicted in FIG. 4 wherein the improved adsorbent cartridge 22, which is analogous in all respects to cartridge 10 described above with respect to FIGS. 1-3, is shown in position within cylindrical container 23 having a circular bottom 24 and a cap 25. In the combination of FIG. 4 cartridge 22 has its lower circular end 26 resting on container bottom 24 and cartridge 22 occupies substantially the entire diameter of the inside of container 23 so that the pills 27 must come to rest on circular cartridge top 28 which acts as a shelf.

Because of the great disparity in appearance between cartridge 22 and pills 27, there obviously can be no mistake between them and therefore cartridge 22 cannot be accidently consumed. Furthermore, because top 28 is relatively soft, as compared to container bottom 24, there is less likelihood of fracturing pills 27 during loading of the pills into container 23. In addition, the volume occupied by cartridge 22 can be calculated in a precise manner so that the size of the container 23 can be predetermined with great accuracy for specific loads, whereas this is not necessarily the case in combinations where the cartridge is positioned at random rather than in precise relationship to the remainder of the container.

While the improved cartridge of the present invention is shown as having two flat ends, it will be appreciated that under certain circumstances one flat end may be sufficient to achieve certain objectives.

It can thus be seen that the improved adsorbent cartridge of the present invention is manifestly capable of achieving the above enumerated objects and advantages and while preferred embodiments have been disclosed, it will be appreciated that the present invention is not necessarily limited thereto but may be otherwise embodied within the scope of the following claims.

What is claimed is:

1. An adsorbent cartridge for random insertion into a container comprising a one-piece casing defining an enclosed space and fabricated entirely of permeable material and including a side wall having a longitudinal axis and first and second opposed end walls which are integral continuations of said side wall, said side wall and said end walls each being fabricated from a single thickness of said permeable material, said side wall and said end walls being of substantially the same total thickness, said first and second end walls being substantially flat and extending substantially perpendicularly to the longitudinal axis of said side wall, and adsorbent material in said enclosed space.

2. An adsorbent cartridge as set forth in claim 1 wherein said side wall is substantially cylindrical and wherein said first and second end walls are substantially circular, and first and second rounded annular junctions between said side wall and said first and second end walls, respectively.

* * * * *